INVENTOR.
HARRY W. CROMIE
BY
Brown, Critchlow, Flick & Peckham.
ATTORNEYS.

United States Patent Office 3,464,065
Patented Sept. 2, 1969

3,464,065
PROSTHETIC HEART VALVE
Harry W. Cromie, Pittsburgh, Pa., assignor to Surgitool Incorporated, Pittsburgh, Pa., a corporation of Pennsylvania
Filed July 8, 1965, Ser. No. 470,395
Int. Cl. A61f 1/00
U.S. Cl. 3—1
12 Claims

ABSTRACT OF THE DISCLOSURE

An artificial heart valve having an annular body with an axial fluid passage through it and a movable closure member for the passage is encircled by a toroidal fabric cuff that projects radially from the body. The cuff is formed from a fabric tube anchored at its inner end to a rigid ring and wrapper axially upon itself completely around the ring, which holds the cuff against the valve body.

---

In my Patent 3,143,742, a prosthetic heart valve is disclosed which is designed to be installed in the human heart without having to be sutured in place. It is held in place by metal pins that project from the side of the valve body. Many valves have been manufactured and sold under this patent and are in satisfactory use. Occasionally, however, a heart surgeon wishes to add sutures, which cannot be done with the valve shown in my patent. Suturing may be desired because it is difficult for a surgeon to accept the fact that sutures are unnecessary, or he may feel that the valve will be held more securely in place if he adds a few sutures. Also, there are cases where the shape of the heart opening that receives the valve is so irregular that the round valve does not fill out the opening. It is then necessary to pull one or more portions of the wall of the opening in against the valve and hold it there by sutures.

Unlike my patented valve, suture type heart valves are in use which are encircled by fabric cuffs, to which the surrounding heart tissue is stitched to hold the valves in place, but those cuffs are difficult and expensive to make.

It is among the objects of this invention to provide a prosthetic heart valve with a cuff for sutures, which is simple and easy to make, which can be quickly and inexpensively produced, and which can be quickly and securely attached to the valve body.

The preferred embodiment of the invention is illustrated in the accompanying drawings, in which.

Figure 1:
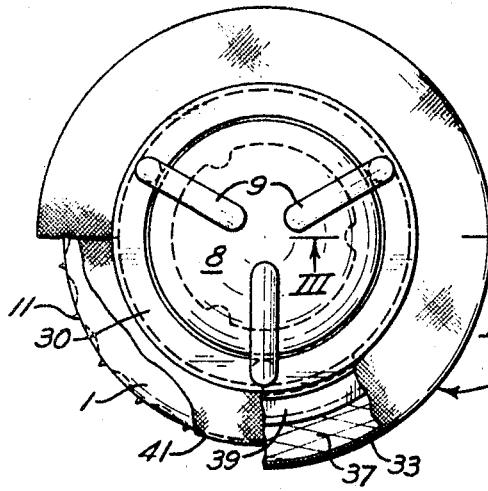
FIG. 1 is a plan view of my valve, with portions broken away.

This invention may be practiced with a suture type heart valve or with a valve constructed in substantially the same manner as the one shown in my above-mentioned patent. For the purpose of this disclosure, a valve similar to my patented valve will be described. Accordingly, referring to FIGS. 1 to 3 of the drawings, it will be seen that the body of the valve is formed from three coaxial rings, consisting of two outer rings 1 and 2 and an inner ring 3. Ring 2 is at the inlet and ring 1 at the outlet of the valve. The two outer rings are spaced apart vertically and encircle the opposite ends of the inner ring. The inner ring is rotatably mounted in the outer rings and is screwed into at least one of them so that when it is turned in a clockwise direction it will pull the two outer rings together. That can be done most rapidly if the inner ring is provided with right and left-hand threads 4 and 5, onto which the outer rings are screwed so that when the inner ring is turned the two outer rings will be moved toward each other simultaneously. For turning the inner ring, it may be provided at the bottom with a plurality of lugs 6 that can be engaged by a suitable tool.

The rings support a check valve, such as a ball and seat, although other types of check valve members may be used, such as flaps or cups. Most conveniently, the seat 7 (FIG. 3) is formed in the inner ring by tapering its inner surface downwardly when a ball 8 is to be used as the check valve member. In that case, a cage for retaining the ball may be formed by providing the upper ring with upwardly extending prongs 9 that curve over the top of the ball.

Figure 3:
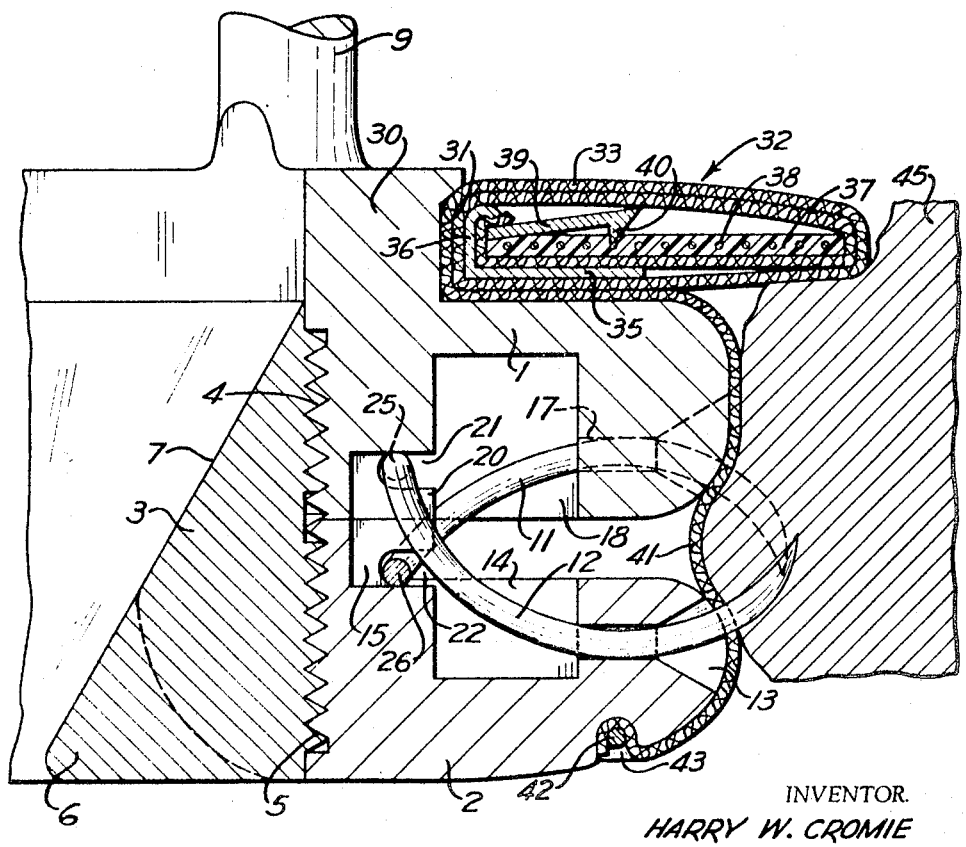
FIG. 3 is an enlarged fragmentary vertical radial section of the valve in place in a heart.

A feature of this valve is that it can be very quickly fastened in place mechanically without the use of sutures. For this purpose it is provided with a plurality of curved pins that are projected radially from at least one of the outer rings in order to pierce the surrounding heart tissue when the two outer rings are drawn toward each other. Preferably, there are two series of pins, an upper series 11 and a lower series 12. Each series is pivotally mounted in a different outer ring and slidably mounted in the other one so that the upper and lower pins cross each other. More specifically, the inlet ring 2 is provided with a plurality of circumferentially spaced short radial passages 13, the outer ends of which are exposed around the periphery of the ring. The inner ends of these passages communicate with the space between the outer rings. Preferably, this is accomplished by providing the inlet ring with a downwardly extending annular groove 14, into the outer side of which the inner ends of the passages open. The ring extends above the inner side of the groove and this raised portion is provided with an inwardly and downwardly extending radial slot 15 opposite each passage 13 as shown in FIG. 3. Between each pair of these slots there is a similar slot.

The outlet ring 1 is provided in the same general way with a plurality of radial passages 17, but they are staggered relative to those in the inlet ring so that they are disposed between them. At the inner ends of these upper passages there is an upwardly extending annular groove 18, from the lower inner side of which a plurality of radial slots extend inwardly and upwardly. These slots are directly above those in the lower ring, slots 20 being above slots 15. The grooves and slots form recesses at the inner ends of the radial passages, with the recesses in the upper ring facing those in the lower ring. All of the thin vertical walls between the slots in each ring are provided with inwardly extending notches, notches 21 being in the upper ring and notches 22 in the lower ring.

Disposed in each lower passage 13 is the pointed outer end portion of a pin 12 curved in a vertical plane. As shown in FIG. 3, the pin extends inwardly from the passage, across the adjoining groove 14 and then curves up through the adjacent slot 15 and across the space between the upper and lower rings and into a slot 20 in the upper ring. The upper or inner end of this pin has a laterally bent portion that extends into one of the notches 21 beside it to hold the pin in place and yet permit it to swing in a vertical plane. Preferably, the pins are made in pairs, with their laterally projecting portions formed by a single cross piece 25 that is integral with both pins, so that the element is U-shape. Like pairs of curved pins are mounted in the other passages in the lower ring and are pivoted in notches 21 in the upper ring. Also, similar curved pairs of pins 11 have their pointed end portions slidably mounted in passages 17 in the upper ring, from which they extend inwardly across the adjoining annular groove 18 and curve down through the upper slots between slots 20 and across the space between the two rings. The lower or inner end portions of these pins extend down into the slots in the lower ring between pins 12, and their integral cross pieces 26 are pivotally retained in notches 22 in the side walls of those slots. It will, therefore, be seen that the upper series of pins are staggered relative to the lower series, and that the inner portions of the upper and lower pins cross each other between the rings. The annular grooves 14 and 18 aid in inserting the cross pieces of the pins in notches 21 and 22.

It is a feature of this invention that the valve body formed by rings 1, 2 and 3 is encircled by a fabric cuff that will receive sutures when the heart surgeon wishes to use them in addition to the pins. Accordingly, the inner part of the upper ring is provided with a narrow vertical extension 30, the outside of which is provided with an outwardly opening shallow groove or channel 31. A toroidal fabric cuff 32 is mounted in this channel and extends radially outward across the upper ring and projects beyond it. The cuff contains a core that preserves the shape of the cuff and holds it in place. The core is formed from one or more rigid metal rings and preferably also a flexible reinforcing ring that can be penetrated by a needle. The cuff itself is formed from a short tubular piece 33 of fabric, such as knitted Dacron. One end of the fabric tube is anchored to the core concentrically therewith, and then the tube is rolled or wrapped axially upon itself around the core to form the toroid-like cuff. One way of doing this is illustrated in FIGS. 4 to 7.

Figure 4:
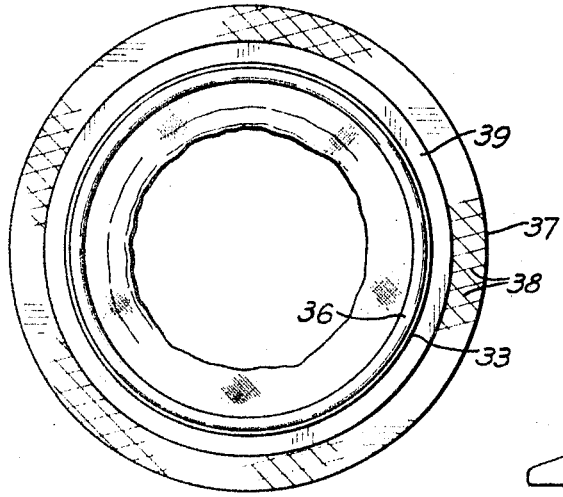
FIG. 4 is an enlarged plan view of the cuff in the first stages of its manufacture.
Figure 5:
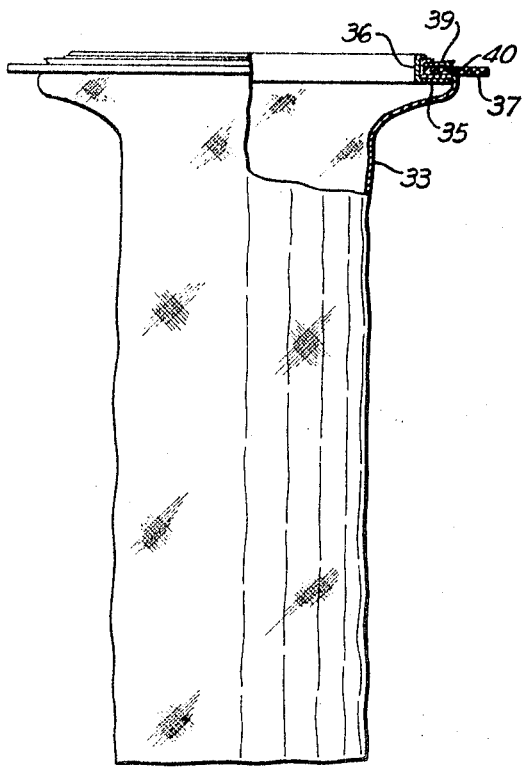
FIG. 5 is a side view of the construction shown in FIG. 4, with parts broken away in section.

Thus, as shown in FIGS. 4 and 5, a rigid metal ring 35 has an inner axial flange 36 that extends around the inner edge of a flexible reinforcing ring 37 that extends outwardly beyond the metal ring so that it can receive sutures. For best results, the reinforcing ring is made of a synthetic plastic, such as Dacron, in which a coarse fabric 38 (FIG. 4) is embedded to strengthen it and help prevent sutures from tearing out of it. Before this ring is slipped over flange 36, the upper end of the fabric tube 33 is stretched over the metal ring. Then the reinforcing ring is put in place around the upper end of the tube, which holds the fabric against the ring flange. The portion of the flange projecting above the reinforcing ring then can be bent outward and down over it to clamp the intervening end of the fabric tube in place. However, it is better to first place a narrow metal clamping ring 39 on top of the plastic ring and to provide the bottom of the clamping ring with a sharp annular rib 40. Then, when flange 36 is bent over to clamp the upper end of the fabric tube against the top of the clamping ring, the rib will be pressed into the plastic ring to prevent it from being pulled laterally away from the flange by sutures, due to stretching of the ring. The unit now has the appearance of the construction shown in FIG. 5.

Figure 6:
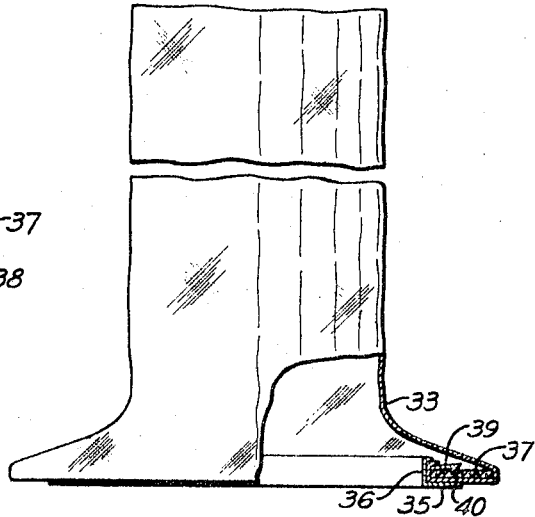
FIG. 6 is a side view showing the next step in making the cuff.
Figure 7:
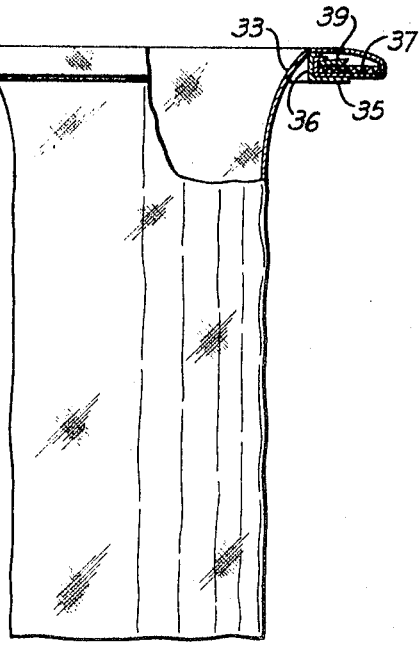
FIG. 7 is a side view of the following step.

The next step is to telescope the fabric tube up around the plastic reinforcing ring by turning the tube inside out, as shown in FIG. 6. Then the straight portion of the tube is again turned inside out as it is passed down through the rings as shown in FIG. 7. This completes a wrap, but it is highly desirable to make at least one more wrap around the rings, which is accomplished by merely repeating the procedure just described.

With the cuff completely formed in this manner, most of the fabric tube projecting downward can be trimmed off with scissors, and then the annulus can be slipped down over valve prongs 9 to valve body extension 30. The inner diameter of the rigid ring 35 is just enough greater than the top of the extension to permit the ring to move down around the extension if no cuff were present. However, the presence of the fabric cuff reduces the inner diameter of the annular unit, so that it becomes necessary to force the cuff and rings down around the extension until the fabric cuff can expand or snap into channel 31 and thereby lock the cuff in place as shown in FIG. 3. The lower wrap of the fabric tube will be clamped by the rest of the cuff against the top of valve body ring 1, and any surplus fabric then can be trimmed away. Reinforcing ring 37 increases the resiliency of the cuff and maintains its shape. It also provides a strong anchor for sutures.

Figure 2:
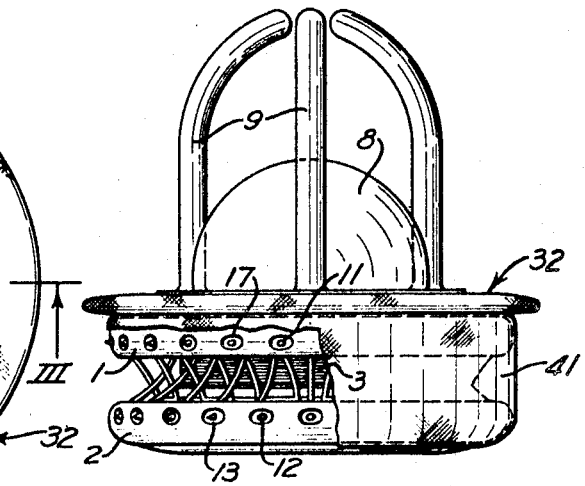
FIG. 2 is a side view of the valve before insertion in a heart and likewise with parts broken away.

In some cases it may be desirable to leave a considerable length of the fabric tube hanging from the core rings while the unit is being applied to the valve body. If that is done, the depending portion of the tube is worked down around the valve body to form a skirt 41 encircling the body rings and all of the pins as shown in FIG. 2. Then the lower end of the skirt is fastened to the bottom ring in any suitable manner, such as by means of a spring ring 42 pressed into a circular groove 43 in the bottom of ring 2. Any excess fabric is trimmed away.

After a defective aortic valve has been excised from a heart, the valve disclosed herein is inserted in place of the removed valve. There will be a ring of tissue around the passage formerly occupied by the excised valve, and this artificial valve, minus ball 8, will be inserted in the passage far enough for the cuff to engage the heart wall 45 around the upper end of the passage, as shown in FIG. 3. The inner ring 3 of the valve body then is rotated by its lugs 6 from above to pull the two outer rings 1 and 2 toward each other, which forces the two series of pins to swing toward each other on their inner ends and move their pointed outer ends out of the radial ring passages and simultaneously toward each other. As they do this, the pointed ends penetrate the fabric skirt 41 and pierce the encircling ring of tissue and embed themselves in it. Preferably, the pins are long enough for the outer ends of the lower pins to cross the pointed ends of the upper pins to some extent. Valve ball 8, which has some resiliency, then can be squeezed between a pair of the prongs 9 and dropped on its seat 7. The heart wall engages the fabric skirt all the way around the valve, and since the pins extend into the heart tissue all around the valve the latter is held firmly, safely and permanently in place. The operation of fastening the valve in place by means of the pins is performed very quickly, because all of the pins are moved simultaneously.

Engagement of the fabric cuff with the heart wall helps to produce a good seal between the valve and heart. If desired, the heart can be sutured to the cuff. This is most likely to occur when the shape of the valve-receiving opening in the heart is such that the valve does not fit as well as desired. In such a case, the wall of the heart can be pulled in against the skirt wherever necessary by suturing to the cuff.

According to the provisions of the patent statutes, I have explained the principle of my invention and have illustrated and described what I now consider to represent its best embodiment.

I claim:

1. In a prosthetic heart valve having an annular body provided with an axial fluid passage therethrough, a movable closure member for said passage connected with said body, and a toroidal fabric cuff encircling the valve body and projecting radially therefrom; a rigid ring inside the cuff, the cuff being formed from a fabric tube anchored at its inner end to the ring concentrically therewith and wrapped axially upon itself completely around the ring, said ring holding the cuff against the valve body.

2. In a prosthetic heart valve according to claim 1, said valve being provided with an encircling outwardly open radial channel, and said ring and cuff being mounted in said channel with the cuff projecting therefrom, the inner diameter of the cuff being less than the outer diameter of the side walls of said channel, and the inner diameter of the ring being substantially the same as the outer diameter of one of said side walls.

3. In a prosthetic heart valve according to claim 1, the outer end of said tube being anchored to the valve body.

4. In a prosthetic heart valve having an annular body provided with an axial fluid passage therethrough, a movable closure member for said passage connected with said body, and a toroidal fabric cuff encircling the valve body and projecting radially therefrom; a rigid ring, and a flexible reinforcing ring concentric with the rigid ring and projecting radially therefrom inside the cuff, the cuff being formed from a fabric tube anchored at its inner end to the rigid ring concentrically therewith and wrapped axially upon itself around both rings, the rigid ring holding the cuff against the valve body.

5. In a prosthetic heart valve according to claim 4, said inner end of the cuff being clamped between said rings.

6. In a prosthetic heart valve according to claim 4, said reinforcing ring being formed from a synthetic plastic in which a fabric is embedded.

7. In a prosthetic heart valve having an annular body provided with an axial fluid passage therethrough, a movable closure member for said passage connected with said body, and a toroidal fabric cuff encircling the valve body and projecting radially therefrom; a rigid ring, a flexible reinforcing ring concentric with the rigid ring and projecting radially therefrom inside the cuff, the rigid ring overlying one side of the reinforcing ring, and a clamping ring inside the cuff at the other side of the reinforcing ring, the cuff being formed from a fabric tube, said rigid ring clamping the other two rings and the inner end of said tube together, and said tube being wrapped axially upon itself around all three rings.

8. In a prosthetic heart valve according to claim 7, said rigid ring having an inner flange extending around the inner edge of the reinforcing ring and the clamping ring and overlapping them and the inner end of said tube to clamp them together.

9. In a prosthetic heart valve according to claim 7, said clamping ring being provided with a sharp annular rib pressing into said reinforcing ring.

10. A prosthetic heart valve comprising a pair of coaxial and relatively movable valve body rings provided with an axial fluid passage therethrough, a movable closure member for said passage supported by the rings, one of the rings being provided with an encircling outwardly opening channel, a rigid ring encircling the channel, a cuff formed from a fabric tube clamped at its inner end to the rigid ring concentrically therewith and wrapped axially upon itself around the ring, the cuff projecting into the channel and tightly engaging its side walls and also projecting radially from said valve body rings, the outer portion of one of said body rings being provided with a plurality of circumferentially spaced radial passages therethrough, a plurality of curved pins having pointed outer end portions slidably disposed in said passages, the inner ends of the pins being pivotally mounted on transverse axes in the other of said body rings, whereby when one of the valve body rings is moved in a predetermined direction relative to the other pins will be projected from said passages into tissue-piercing position.

11. The method of forming a prosthetic heart valve toroidal cuff, comprising clamping one end of a fabric tube between a rigid ring and a flexible reinforcing ring having a greater outer diameter than the rigid ring, telescoping the tube over the outer edge of the reinforcing ring, passing the free portion of the tube through the rings, again telescoping the tube over the outer edge of the reinforcing ring, and then again passing the remaining portion of the tube through the rings, whereby the rings are covered by the tube wrapped around them.

12. The method of providing a prosthetic heart valve body with a toroidal cuff and a skirt, comprising clamping one end of a fabric tube between a rigid ring and a flexible reinforcing ring having a greater outer diameter than the rigid ring, telescoping the tube over the outer edge of the reinforcing ring, passing the free portion of the tube through the rings, again telescoping the tube over the outer edge of the reinforcing ring and then again passing the remaining portion of the tube through the rings and extending its axially therefrom to form a skirt, mounting the cuff on end of the valve body and pulling said skirt over said body, and then securing the free end of the skirt to the opposite end of the valve body.

References Cited

UNITED STATES PATENTS

| | | | |
|---|---|---|---|
| 3,099,016 | 7/1963 | Edwards | 3—1 |
| 3,143,742 | 8/1964 | Cromie | 3—1 |
| 3,263,239 | 8/1966 | Edwards et al. | 3—1 |
| 3,371,352 | 3/1968 | Siposs et al. | 3—1 |

OTHER REFERENCES

"An Inverted Tricuspid Plastic Mitral Valve" by Richard W. Ernst et al., The Journal of Thoracic and Cardiovascular Surgery, vol. 46, No. 6, December 1963, pages 737–743.

German printed application 1,180,087, Seidel, October 1967.

RICHARD A. GAUDET, Primary Examiner

RONALD L. FRINKS, Assistant Examiner